US006951397B1

(12) United States Patent
Winzer

(10) Patent No.: US 6,951,397 B1
(45) Date of Patent: Oct. 4, 2005

(54) COMPOSITE ULTRA-LIGHT WEIGHT ACTIVE MIRROR FOR SPACE APPLICATIONS

(75) Inventor: Stephen Randolph Winzer, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 177 days.

(21) Appl. No.: 10/099,982

(22) Filed: Mar. 19, 2002

(51) Int. Cl.[7] .................. G02B 5/10; G02B 7/185; G02B 7/188
(52) U.S. Cl. .................. 359/846; 359/838; 359/849
(58) Field of Search .................. 359/291, 292, 359/295, 846, 847, 848, 849, 838, 883; 343/914, 915; 250/201.9

(56) References Cited

U.S. PATENT DOCUMENTS

| | | | | |
|---|---|---|---|---|
| 3,599,218 | A | * 8/1971 | Williamson et al. | 343/840 |
| 3,923,400 | A | * 12/1975 | Hardy | 356/521 |
| 4,093,351 | A | * 6/1978 | Perkins et al. | 359/847 |
| 4,124,277 | A | * 11/1978 | Stang | 359/846 |
| 4,655,563 | A | * 4/1987 | Plante et al. | 359/849 |
| 5,159,498 | A | 10/1992 | Hubbard, Jr. | |
| 5,178,709 | A | * 1/1993 | Shimodaira et al. | 156/242 |
| 5,440,320 | A | * 8/1995 | Lach et al. | 343/915 |
| 5,662,294 | A | * 9/1997 | Maclean et al. | 244/219 |
| 6,113,242 | A | 9/2000 | Marker et al. | |
| 6,236,490 | B1 | * 5/2001 | Shen | 359/247 |
| 6,293,027 | B1 | * 9/2001 | Elliott et al. | 33/546 |
| 6,344,835 | B1 | * 2/2002 | Allen et al. | 343/915 |
| 6,533,426 | B2 | * 3/2003 | Carreras et al. | 359/847 |
| 2002/0048096 | A1 | * 4/2002 | Melzer et al. | 359/846 |
| 2003/0147162 | A1 | * 8/2003 | Bennett et al. | 359/849 |

FOREIGN PATENT DOCUMENTS

| | | | |
|---|---|---|---|
| DE | 4206792 A1 | * | 9/1993 |
| JP | 01-154606 | * | 6/1989 |
| JP | 03-143003 A | * | 6/1991 |
| JP | 04-176202 A | * | 6/1992 |

OTHER PUBLICATIONS

R.E. Aldrich, "Deformable Mirror Wavefront Correctors", Adaptive Optics Engineering Handbook, Ch. 5, R.K. Tyson, ed. (U. North Carolina, Charlotte), Marcel Dekker, Inc. Publ., New York, (c) 2000.*

Ultra Lightweight Space Optics Challenge Workshop, article, Mar. 24, 1999, 1 page, Napa, California.

(Continued)

*Primary Examiner*—John Juba, Jr.
(74) *Attorney, Agent, or Firm*—McDermott Will & Emery

(57) ABSTRACT

A lightweight active mirror. A first layer has a front side and a backside. A second layer has a front side and a backside. The backside of the second layer faces the front side of the first layer. A reflective surface is on the front side of the second layer. The reflective surface is operable to reflect desired wavelengths of electromagnetic radiation. A plurality of electroactive actuator strips arranged between the first layer and the second layer are operable to alter a curvature of the mirror. Electrical connectors are operable to cause the electroactive strips to alter the curvature of the mirror. A plurality of stiffening elements interconnected with at least one of the first layer and the second layer are operable to stiffen the mirror. A plurality of shape retaining elements attached to at least one of the first layer and the second layer are operable to deploy the mirror and to bias the mirror in a desired position.

20 Claims, 3 Drawing Sheets

OTHER PUBLICATIONS

W. Hoffmann et al., Active Composite Membrane Mirrors, Ultra Lightweight Space Optics Challenge Workshop Mar. 24, 1999, 8 pages.

D. Giles et al., Semi Rigid and Adjustable CFRP Membrane for Radio Telescope Applications, presented at Ultra Lightweight Space Optics Challenge Workshop Mar. 24, 1999, 7 pages.

J. Main et al., Noncontact Shape Control of Membrane Mirrors, Ultra Lightweight Space Optics Challenge Workshop Mar. 24, 1999, 8 pages.

J. Moore, Jr. et al., Ultra-lightweight Precision Membrane Optics, Ultra Lightweight Space Optics Challenge Workshop Mar. 24, 1999, 3 pages.

* cited by examiner

COMPOSITE ULTRA-LIGHT WEIGHT ACTIVE MIRROR FOR SPACE APPLICATIONS

FIELD OF THE INVENTION

The present invention relates to a composite mirror structure that includes elements for deploying and controlling the contour and optical figure of the mirror. The present invention is particularly useful in space-based applications.

BACKGROUND OF THE INVENTION

Reflecting structures, such as mirrors, are employed for a variety of transmission and receiving functions. To ensure proper functioning, it is important that reflecting structures, such as mirrors, maintain their shape. However, reflecting structures are subjected to a variety of forces that can alter their contour and, thus, prevent them from functioning properly. While terrestrial reflecting structures may be reinforced without regard to weight, size, and other constraints, space-based reflecting structures must be designed in-line with weight and size constraints inherent in launching payloads into space. Many other elements of a spacecraft are competing for the limited mass that any launch vehicle can lift. Space-based reflecting structures also encounter forces that terrestrial structures do not.

Currently, mirrors utilized in space-based applications are passive structures having more or less fixed contours. However, for most space-based applications, reflecting structures are affected by platform vibrations, thermal changes, phasing, aberrations resulting from looking through the atmosphere, and other forces that can alter their structures and affect their functionality. Space-based reflecting structures must also be stowed for launch and then deploy once in space. The deployment must be precise and capable of adjustment in the short and long term.

SUMMARY OF THE INVENTION

The present invention provides a lightweight active mirror. The mirror includes a first layer having a front side and a backside. The mirror also includes a second layer having a front side and a backside. The backside of the second layer faces the front side of the first layer. A reflective surface is arranged on the front side of the second layer. The reflective surface is operable to reflect desired wavelengths of electromagnetic radiation. A plurality of electroactive actuator strips are arranged between the first layer and the second layer and are operable to alter a curvature of the mirror. Electrical connectors are operable to cause the electroactive strips to alter the curvature of the mirror. A plurality of stiffening elements are interconnected with at least one of the first layer and the second layer and operable to stiffen the mirror. A plurality of shape retaining elements are attached to the first layer and/or the second layer and operable to deploy the mirror and to bias the mirror in a desired position.

Still other objects and advantages of the present invention will become readily apparent by those skilled in the art from a review of the following detailed description. The detailed description shows and describes preferred embodiments of the present invention, simply by way of illustration of the best mode contemplated of carrying out the invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood from the following specification when considered in conjunction with the accompanying drawings, in which:

FIG. 1a represents a view of an embodiment of the front side of the first layer of an embodiment of a mirror according to the present invention;

FIG. 1b represents a view of the backside of the embodiment of the first layer represented in FIG. 1a;

FIG. 2a represents a view of an embodiment of the front side of the second layer of an embodiment of a mirror according to the present invention;

FIG. 2b represents a view of the back side of the embodiment of the second layer shown in FIG. 2a.

DETAILED DESCRIPTION OF THE INVENTION

Figures 1A, 1B:
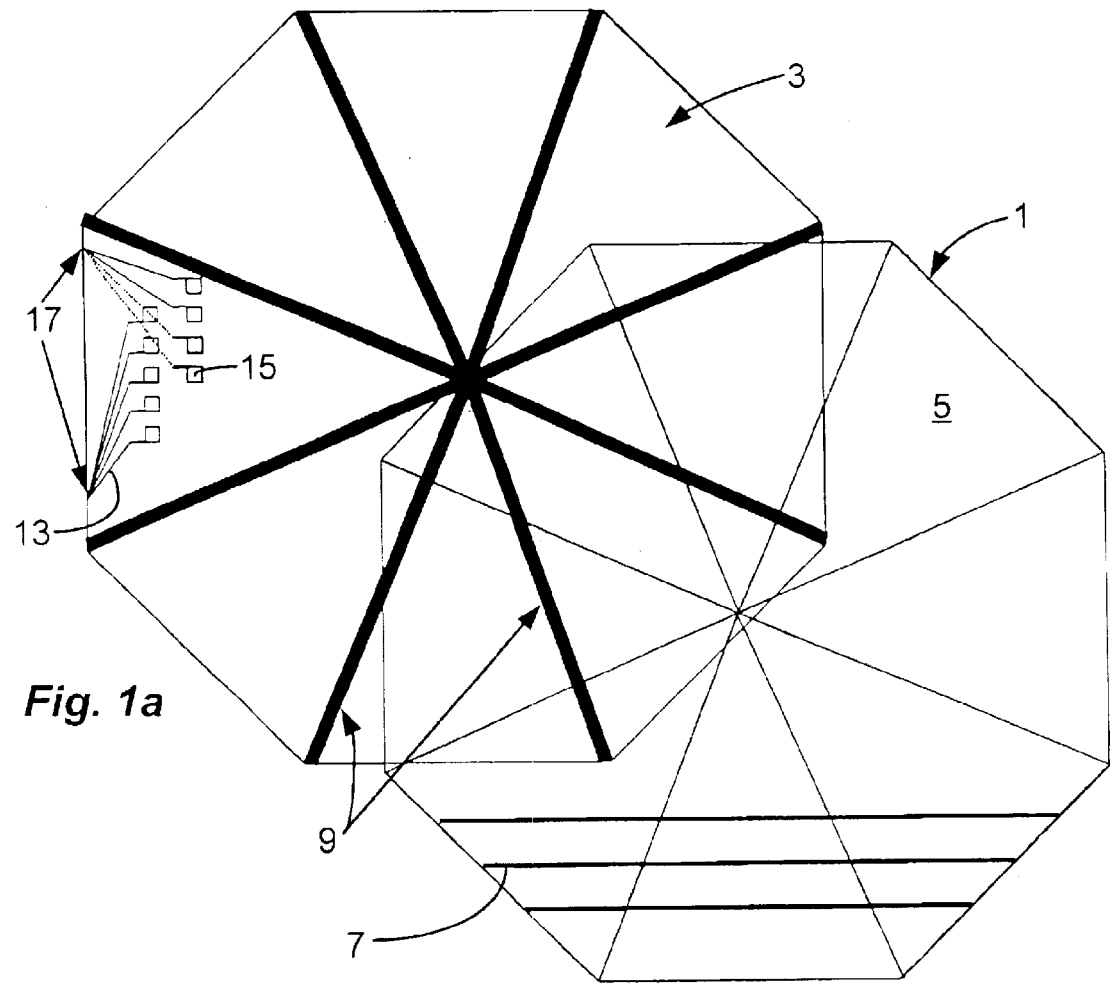

The present invention provides a reflecting structure that includes elements that can alter the contour of the reflecting structure while the reflecting structure is in use. The present invention may be employed with any type of reflecting structure. The exemplary embodiment described is a mirror. Examples of mirrors that the present invention can be incorporated into include large aperture space-based mirrors for telescopes used in astronomical observation, earth observation, and reconnaissance. However, the present invention may be incorporated into other reflecting structures.

An advantage of the present invention is that it can be made ultra-light. This is particularly important in view of the weight constraints on any spacecraft. Additionally, the present invention can operate at cryogenic temperatures. The present invention provides a precision deployable structure that can actively optimize performance of a mirror and telescope while still retaining a weight advantage desired for low cost deployment of large aperture optical devices from earth. Another advantage of the present invention is that it includes embedded actuators and circuitry.

A reflecting structure according to the present invention includes a first layer 1 or backplane. The first layer 1 has a front side 3 and a back side 5. The first layer 1 typically has a shape and surface area similar to the desired overall shape and surface area of the reflecting structure. Reflecting structures such a the present invention may be made in any dimensions. Typically, such structures have a diameter of about 2 meters to about 40 meters.

The thickness of the film depends at least in part upon the material being utilized to form the first layer as well as the desired strength of the first layer. Additionally, as described in greater detail below, reinforcing elements may be incorporated into the first layer. This can also affect the thickness of the first layer. Typically, the first layer has a thickness of about 2 $\mu$m to about 10 $\mu$m.

Typically, the first layer is made of an electrically insulating material. One example of a material that may be utilized to form the first layer is Kapton®. Other materials that may be employed include polyvinylidene difluoride, vinyl, nylon, graphite/epoxy composites, and/or carbon nanotube composites.

The present invention also includes stiffening elements 9. The stiffening elements 9 help to strengthen the structure as well as maintain what could be considered a default position of the reflecting structure. The default position may or may not be functional position of the structure. The stiffening elements typically tend to assume a particular desired position.

In addition to strengthening the structure, the stiffening elements can also serve as a means to deploy a reflecting structure according to the present invention. Along these lines, if the stiffening elements tend to return to a shape in which the reflecting structure is deployed, then force may be applied to the stiffening elements and the reflecting structure to move the structure into a stowed position. After launch, the force may be released and the stiffening elements will move to their deployed position.

The stiffening elements may be made of a variety of materials that can provide both stiffening and flexibility to move the reflecting structure from a stowed position to a deployed position. One material that is particularly suited as use as a stiffening element is carbon fiber reinforced elements. Carbon fiber elements also are sufficiently lightweight to satisfy the weight requirements for spacecraft. Carbon nanotube structures could also be employed.

The size, shape, arrangement and interconnection with the reflecting structure may vary. One embodiment of a reflecting structure includes a plurality of parallel carbon fiber stiffening rods 7 extending entirely across the reflecting structure. Other configurations could include a ring (not shown), in which the surface is stretched, an umbrella-like structure. FIG. 1b illustrates such an embodiment, although FIG. 1b only illustrates three examples. Typically, a reflecting structure would include a number of rods 7 sufficient to cover the entire structure. Such rods typically would have a diameter of about 1 mm to about 10 mm. The thickness typically would provide a desired degree of stiffness and ability to deploy the structure.

Figure 3:
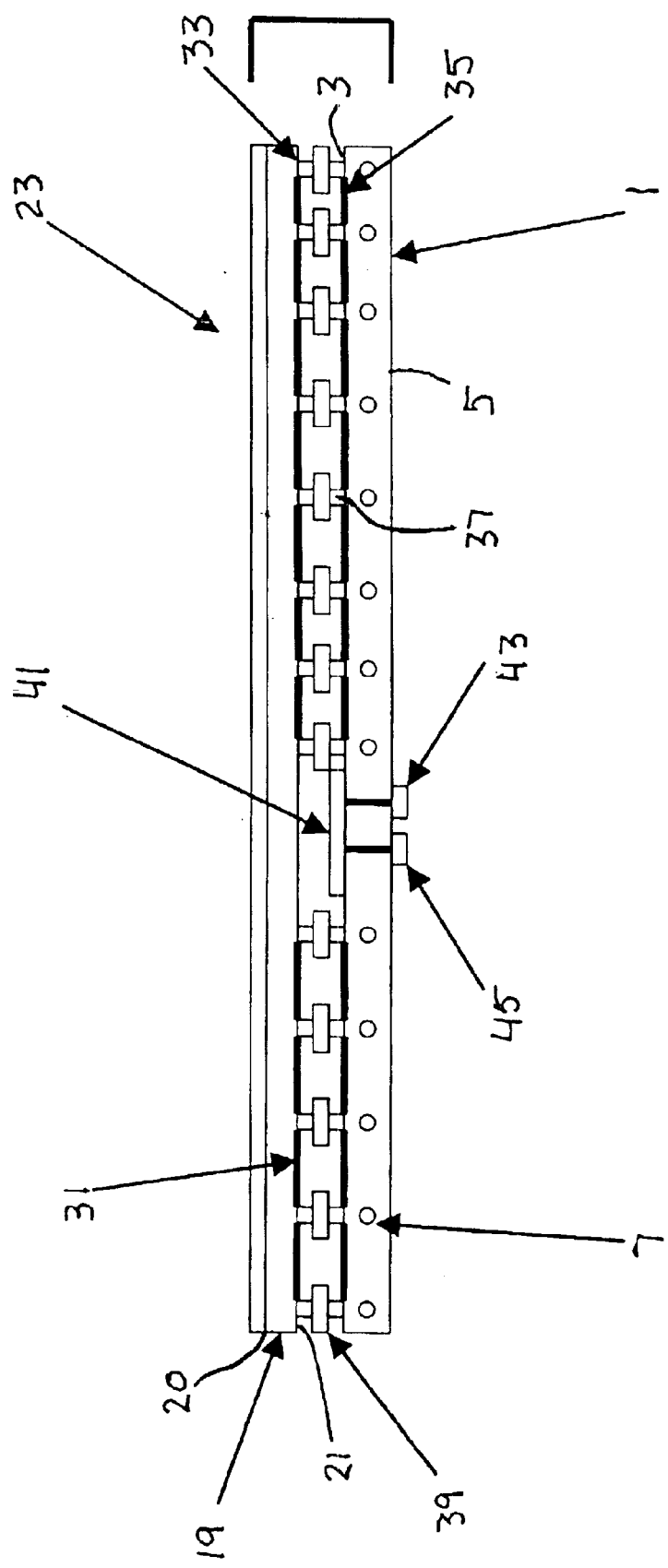
FIG. 3 represents a cross-sectional view of an embodiment of a mirror according to the present invention.

In one embodiment that includes carbon fiber stiffening rods, the rods 7 are incorporated into the first layer 1. FIG. 3 illustrates a cross-sectional view of such an embodiment. This embodiment includes a first layer 1 formed of Kapton®. In this case, the carbon fibers would be laid up on one surface of Kapton then sandwiched by placing another layer on top of the first and bonding the two by heating above the glass transition temperature.

The present invention also includes a second layer 19 or front plane. The second layer 19 includes a front side 23 and a backside 21. The backside 21 of the second layer 19 faces the front side 3 of the first layer 1. The second layer 19 typically has a shape and surface area similar to the desired overall shape and surface area of the reflecting structure. Typically, the first layer 1 and the second layer 19 have substantially similar sizes, although the thicknesses of the two layers may differ.

The thickness of the film depends at least in part upon the material being utilized to form the second layer 19 as well as the desired strength of the second layer 19. Typically, the second layer 19 has a thickness of about 1 µm to about 5 µm.

The stiffening elements may also be arranged in the second layer 19. They could be arranged in any desired configuration. If employed with stiffening elements in the first layer 1 as well, the stiffening elements in the second layer 19 could be arranged running 90 degrees to the stiffening elements in the first layer 1 or in a fan shape to help maintain initial curvature, among other configurations.

Typically, the second layer 19 is made of an electrically insulating material. One example of a material that may be utilized to form the second layer 19 is Kapton®. Other materials that may be employed include PVDF, vinyl and/or nylon.

A reflecting surface 20 is present on the front side 23 of the second layer 19. The reflecting surface 20 reflects wavelengths of electromagnetic radiation that it is desired to reflect with the reflecting structure. Examples of materials that may be employed as the reflecting structure include Al, Au, Cr, and/or reflecting dielectric materials. Generally, the reflecting material has a thickness of a few tens of angstroms. The thickness can depend upon, among other factors, the wavelength of electromagnetic radiation of interest.

Typically, the reflecting surface 20 has s thickness sufficient to provide a desired degree of reflectivity and durability. Other factors that may be taken into account in determining the thickness of the reflecting surface can include the electrical properties of the reflective coating materials, particularly for reflecting dielectric materials. Another factor is the wavelength of electromagnetic radiation. Additionally, compatibility with the substrate on which the material is being deposited can be taken into account. One factor in compatibility is adhesion. Furthermore, the conditions of the deposition may be taken into account when determining the thickness of the material.

The reflecting surface may be formed in a variety of ways. It may be deposited by chemical vapor deposition, by sputtering, by solution polarized by gel lation (sol-gel).

In addition to the stiffening elements describes above, the present invention may also include a plurality of shape retaining elements 41. The shape retaining elements 41 can include one or more materials that have a shape-retaining property. Counterbalancing forces between the shape retaining elements 41 and the stiffening elements 7 coarsely shape the reflecting structure. Smaller, fine adjustments of the structure can be carried out utilizing electroactive elements 39 as described herein.

Examples of materials that may be utilized as shape retaining elements include so-called shape memory alloys. One example of a shape memory alloy that may be utilized according to the present invention is NiTiNOL, an alloy of nickel and titanium.

The shape retaining elements 41 may be arranged in and interconnected with the first layer 1 and/or the second layer 19 of the reflecting structure. As with the stiffening elements 7, the shape retaining elements 41 may be incorporated into one or both of the first layer 1 and the second layer 19. Typically, the shape retaining elements 41 are attached to the surface of the first layer 1 and/or the second layer 19. FIG. 3 illustrates an embodiment in which the shape retaining elements 41 are attached to the front side 3 of the first layer 1.

The shape retaining elements may be incorporated in any manner with the reflecting structure that permits the shape retaining elements to properly function. Along these lines, the number, dimensions and arrangement of the shape retaining elements may vary. Among the factors that can affect the number and dimensions of the shape retaining elements are the size of the reflecting structure, anticipated stress levels on the reflecting structure, and/or wavelengths of electromagnetic radiation of interest, among other factors. A bigger structure might include more elements, as could a structure subject to greater stresses.

FIG. 1a illustrates an embodiment that includes eight shape-retaining elements 9 attached to the front side 3 of the first layer 1 of the reflecting structure. The eight elements extend from one side of the first layer 1 to the center of the layer. These shape-retaining elements 9 have a thickness of less than about 1 µm and a length of about 1 to about 20 meters, depending upon aperture.

Depending upon the nature of the shape retaining elements, their shape may be altered. In such embodiments, the reflecting structure may include elements for altering the shape of the shape retaining elements. For example, the shape of shape retaining elements made of NiTiNOL and other shape memory alloys may be altered through application of heat. Sufficient heat applied to the film can induce a martinsitic phase transformation, causing the material to contract or expand. If heat can alter the shape of the shape retaining elements, to apply heat to the shape retaining elements, the reflecting structure can include one or more elements to supply current to the shape memory alloy. The resistance of the shape memory alloy causes a rise in temperature, which induces the transformation. Along these lines, the embodiment shown in FIGS. 1a and 1b includes copper lines conduct current to the NiTiNOL film, heating the film and inducing the shape change.

The shape retaining elements may be formed with an applicable process. According to one embodiment, the shape retaining elements are printed on the first and/or the second layer of the reflective structure. The printing may be carried out utilizing microlithography techniques typically utilized in microelectronics manufacturing. Along these lines, chemical vapor deposition and sputtering may be utilized. Sputtering may produce particularly favorable results.

To impart the ability to alter the shape of the reflecting structure, the present invention includes electroactive elements that in response to signals may alter their shape. The electroactive elements can provide fine structure control for phasing, vibration correction, thermal deforming loads, non-thermal deforming loads, aberrations resulting, for example, from looking through the atmosphere, and/or other factors that can affect the telescope performance. The electroactive elements can permit real-time correction of changes due to such influences or others.

The electroactive elements may be arranged in a variety of ways in and/or on the reflective structure. For example, the reflecting structure may include a plurality of regions of electroactive material. The regions could have a variety of shapes. For example, the regions could include a plurality of strips of electroactive material. Alternatively, or additionally, the regions could have other shapes, such as rectangles. The regions may be arranged in a variety of configurations. Typically, the number and arrangement of regions of electroactive material are sufficient to permit the desired shape control of the reflecting structure. The embodiment shown in FIG. 2b includes a plurality of rectangular electroactive elements at only three of which are shown. On the other hand, the embodiment shown in FIG. 3 includes a plurality of strips of electroactive material 39.

The electroactive elements may be made of any material that can be controlled to change its shape and, hence, the shape of the reflecting structure. Examples of materials that may be employed are piezoelectric polymer materials and inorganic piezoelectric materials, and organic and inorganic electrostrictive materials. Specific examples of these materials include polyvinylidene di-Fluoride (PVDF), co-polymers of polyvinylidene di-Fluoride, lead zirconate titanate (PZT), lead zinc niobate (PZN), and lead magnesium niobate (PMN). Any material that is ferroelectric and that exhibits sufficient strain for correction can be utilized in the present invention. The materials listed above are the most common materials. PZT and PZN also demonstrate sufficient strain at cryogenic temperatures to be useful.

Piezoelectric elements may be operated in a 1:3 mode or a 3:3 mode. The 3:3 mode refers to extension and retraction in the direction of the applied electric field. On the other hand, the 1:3 mode refers to extension and retraction in a direction 90 degrees to the applied field. Other modes may also be employed. The electroactive elements may work against stiffening elements to cause the mirror to deform in an amount proportional to the voltage and the D-coefficient of the elements. Each element typically is addressable individually to enhance control over the contour of the reflecting structure. Other materials that may be employed in addition to piezoelectric elements are ferroelectric dielectric polymers, co-ter polymers and blends, PVDF/nylon 11 blends. One example of a ferroelectric dielectric polymer that may be employed is P(VDF-TrFe).

To activate the electroactive elements, the reflecting structure includes a plurality of circuit elements for applying a voltage to the electroactive elements. The voltage application circuit elements can include wiring, connectors, actuation pads and/or other circuit elements. FIG. 1a illustrates one embodiment of circuit elements that may be included in the reflecting structure. These include wiring 13 printed on the front side 3 of the first layer 1. The wiring 13 leads to contact pads 15 also on the front side 3 of the first layer 1. The contact pads 15 will be in electrical contact with the electroactive elements not shown in FIGS. 1a and 1b. The reflecting structure may include connectors 17 for connecting to a ribbon connector to a microprocessor.

The wiring 13 and contact pads 15 may be formed of an electrically conductive material, such as copper. Typically, according to the present invention, the circuit elements are formed utilizing microlithography techniques usually employed in the microelectronics industry.

Figure 2:
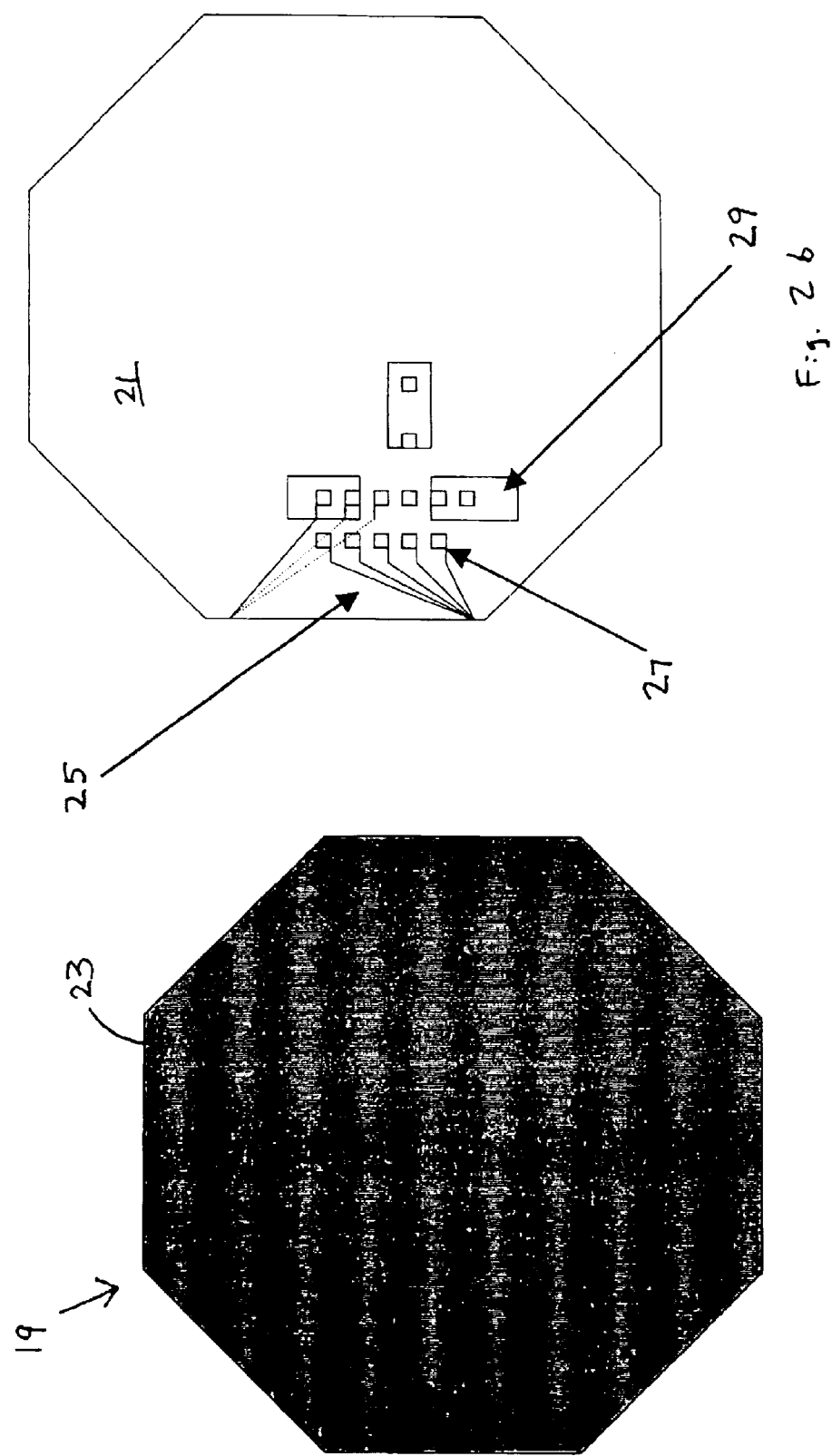

Electroactive elements are shown in FIG. 2b on the back side 21 of the second layer 19. As FIG. 2b shows, the second layer 19 may also include circuit elements (wiring 25 and contact pads 27) to apply the voltage to the electroactive elements. FIG. 2b also illustrates a plurality of rectangular shaped electroactive elements 29. A reflecting structure according to the present invention would typically include many more than the three electroactive elements 29 shown in FIG. 2b. Along these lines, the structure would typically include elements to control the contour of the entire reflecting structure.

FIG. 3 provides a more detailed view of an embodiment of the electroactive elements and circuitry. As shown in FIG. 3, a plurality of negative electrodes 31 may be provided on the backside 21 of the second layer 19. Contact pads 33 are arranged between and in electrical contact with the negative electrodes. Positive electrodes 35 are arranged on the front side 3 of the first layer 1. Contact pads 37 are arranged on the front side of the first layer in electrical connection with the positive electrodes. The electroactive elements 39 are arranged sandwiched between the first layer and the second layer in electrical connection with the contact pads.

The embodiment as shown in FIG. 3 includes a NiTiNOL shape-retaining strip 41. A negative electrode 43 and a positive electrode 45 are provided with the first layer 1 to electrically heat the electroactive shape-retaining strip 41 to alter its shape. In some embodiments, a plurality of shape-retaining strips 41 are symmetrically arranged on and extend substantially entirely across the front side 3 of the first layer 1, such as the shape-retaining strips 9 shown in FIG. 1a.

An embodiment such as that shown in FIG. 3 may have a thickness of about 12 $\mu$m and an average density of about 2 g/cc, such that a square meter of the structure would weigh about 0.24 g without any supporting structure.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. A light-weight active mirror, comprising:
    a first layer having a front side and a back side;
    a second layer having a front side and a back side, the back side of the second layer facing the front side of the first layer;
    a reflective surface disposed on the front side of the second layer, the reflective surface operable to reflect desired wavelengths of electromagnetic radiation;
    a plurality of electroactive actuator strips arranged between and connected with the first layer and the second layer and operable to alter a curvature of the mirror;
    electrical connectors coupled with the electroactive actuator strips and operable to cause the electroactive actuator strips to alter the curvature of the mirror;
    a plurality of stiffening elements interconnected with at least one of the first layer and the second layer and operable to stiffen the mirror; and
    a plurality of shape retaining elements attached to at least one of the first layer and the second layer and comprising a material having a shape-retaining property operable to deploy the mirror and to bias the mirror in a desired position;
    wherein the shape-retaining elements comprise a shape memory alloy.

2. The mirror according to claim 1, wherein the first layer has a thickness of about 2 $\mu$m to about 10 $\mu$m.

3. The mirror according to claim 1, wherein the first layer has a thickness of about 5 $\mu$m.

4. The mirror according to claim 1, wherein the second layer has a thickness of about 1 $\mu$m to about 5 $\mu$m.

5. The mirror according to claim 1, wherein the second layer has a thickness of about 2 $\mu$m.

6. The mirror according to claim 1, wherein the shape-retaining elements comprise strips symmetrically arranged on and extending substantially entirely across the front side of the first layer.

7. The mirror according to claim 1, wherein the shape memory alloy comprises NiTiNOL.

8. The mirror according to claim 1, wherein the electrical connectors comprise:
    a plurality of negative electrodes attached to one of the front side of the first layer and the back side of the second layer;
    a plurality of positive electrodes attached to one of the front side of the first layer and the back side of the second layer to which the negative electrodes are not attached; and
    a plurality of contact pads attached to the front side of the first layer and the back side of the second layer and electrically connected to the negative electrodes and the positive electrodes.

9. The mirror according to claim 8, wherein each electroactive actuator strip contacts at least one contact pad on at least one of the top layer and the bottom layer.

10. The mirror according to claim 8, wherein the positive electrodes and the negative electrodes comprise copper.

11. The mirror according to claim 1, wherein the mirror has a thickness of about 9 $\mu$m to about 12 $\mu$m.

12. The mirror according to claim 1, wherein the mirror has a thickness of about 12 $\mu$m.

13. The mirror according to claim 1, wherein the mirror has an average density of about 2 to about 5 grams per cubic centimeter.

14. The mirror according to claim 1, wherein the mirror has an average density of about 2 grams per cubic centimeter.

15. A light-weight active mirror, comprising:
    a first layer having a front side and a back side;
    a second layer having a front side and a back side, the back side of the second layer facing the front side of the first layer;
    a reflective surface disposed on the front side of the second layer, the reflective surface operable to reflect desired wavelengths of electromagnetic radiation;
    a plurality of electroactive actuator strips arranged between and connected with the first layer and the second layer and operable to alter a curvature of the mirror;
    electrical connectors coupled with the electroactive actuator strips and operable to cause the electroactive actuator strips to alter the curvature of the mirror;
    a plurality of stiffening elements interconnected with at least one of the first layer and the second layer and operable to stiffen the mirror; and
    a plurality of shape retaining elements attached to at least one of the first layer and the second layer and operable to deploy the mirror and to bias the mirror in a desired position;
    wherein the shape-retaining elements comprise strips symmetrically arranged on and extending substantially entirely across the front side of the first layer.

16. A light-weight active mirror, comprising:
    a first layer having a front side and a back side;
    a second layer having a front side and a back side, the back side of the second layer facing the front side of the first layer;
    a reflective surface disposed on the front side of the second layer, the reflective surface operable to reflect desired wavelengths of electromagnetic radiation;
    a plurality of electroactive actuator strips arranged between and connected with the first layer and the second layer and operable to alter a curvature of the mirror;
    electrical connectors coupled with the electroactive actuator strips and operable to cause the electroactive actuator strips to alter the curvature of the mirror;
    a plurality of stiffening elements interconnected with at least one of the first layer and the second layer and operable to stiffen the mirror; and
    a plurality of shape retaining elements attached to at least one of the first layer and the second layer and operable to deploy the mirror and to bias the mirror in a desired position;
    wherein the shape-retaining elements comprise a shape memory alloy.

17. The mirror according to claim 16, wherein the shape memory alloy comprises NiTiNOL.

18. A light-weight active mirror, comprising:

a first layer having a front side and a back side;

a second layer having a front side and a back side, the back side of the second layer facing the front side of the first layer;

a reflective surface disposed on the front side of the second layer, the reflective surface operable to reflect desired wavelengths of electromagnetic radiation;

a plurality of electroactive actuator strips arranged between and connected with the first layer and the second layer and operable to alter a curvature of the mirror;

electrical connectors coupled with the electroactive actuator strips and operable to cause the electroactive actuator strips to alter the curvature of the mirror;

a plurality of stiffening elements interconnected with at least one of the first layer and the second layer and operable to stiffen the mirror; and a plurality of shape retaining elements attached to at least one of the first layer and the second layer and operable to deploy the mirror and to bias the mirror in a desired position;

wherein the electrical connectors comprise:

a plurality of negative electrodes attached to one of the front side of the first layer and the back side of the second layer;

a plurality of positive electrodes attached to one of the front side of the first layer and the back side of the second layer to which the negative electrodes are not attached; and a plurality of contact pads attached to the front side of the first layer and the back side of the second layer and electrically connected to the negative electrodes and the positive electrodes.

19. The mirror according to claim 18, wherein each electroactive actuator strip contacts at least one contact pad on at least one of the top layer and the bottom layer.

20. The mirror according to claim 18, wherein the positive electrodes and the negative electrodes comprise copper.

* * * * *